United States Patent [19]

Astansky et al.

[11] 4,300,517
[45] Nov. 17, 1981

[54] FUEL SUPPLY DEVICE FOR A DIESEL ENGINE

[76] Inventors: Jury L. Astansky, prospekt Lenina, 47, korpus 2, kv. 55; Vladimir A. Romanov, prospekt Lenina, 24"B", kv. 92; Vladimir A. Osadin, ulitsa Uspenskogo, 15, kv. 51, all of Gorky, U.S.S.R.

[21] Appl. No.: 147,243

[22] Filed: May 6, 1980

[51] Int. Cl.³ ............... F02M 25/00; F02M 13/00; F02M 43/00
[52] U.S. Cl. .................. 123/575; 123/515; 123/578
[58] Field of Search ............ 123/575, 576, 578, 515, 123/577

[56] References Cited

U.S. PATENT DOCUMENTS

| | | | |
|---|---|---|---|
| 2,758,579 | 8/1956 | Pinotti | 123/577 |
| 2,821,972 | 2/1958 | Banker | 123/515 |
| 2,865,345 | 12/1958 | Hilton | 123/575 |
| 2,865,355 | 12/1958 | Hilton | 123/577 |
| 2,911,958 | 11/1959 | Griep | 123/577 |
| 2,940,435 | 6/1960 | Nemec et al. | 123/577 |
| 2,984,229 | 5/1961 | Vaughan | 123/577 |
| 3,014,474 | 12/1961 | Banker | 123/575 |
| 3,022,425 | 2/1962 | Rockstead | 123/515 |
| 3,308,794 | 3/1967 | Bailey | 123/575 |
| 3,982,516 | 9/1976 | Abernathy | 123/575 |

FOREIGN PATENT DOCUMENTS

| | | | |
|---|---|---|---|
| 2355696 | 11/1973 | Fed. Rep. of Germany | 123/577 |
| 566950 | 5/1977 | U.S.S.R. | 123/572 |

*Primary Examiner*—Wendell E. Burns
*Attorney, Agent, or Firm*—Robert E. Burns; Emmanuel J. Lobato; Bruce L. Adams

[57] ABSTRACT

Disclosed is a fuel supply device for a diesel engine comprising alternately connected to a diesel engine a light fuel loop and a heavy fuel loop incorporating a tank and a fuel priming pump, the loops communicating with a suction pipe of the diesel engine via a system of stop valves. The light fuel loop is in communication with the diesel engine. The system of stop valves comprises a logical element "OR", the output thereof being connected to the suction pipe of the diesel engine, a pressure controller connected to the first input of the logical element "OR", a flow switch valve having its input connected to the second input of the logical element "OR" and to the fuel priming pump of the heavy fuel loop. The output of the flow switch valve communicates with the tank of the heavy fuel loop.

2 Claims, 2 Drawing Figures

FUEL SUPPLY DEVICE FOR A DIESEL ENGINE

FIELD OF THE INVENTION

The present invention relates to internal combustion engines and more particularly to fuel supply devices for a diesel engine.

More specifically, the present invention can be used in a device for supplying fuel to diesel engines employing two kinds of fuel: heavy fuel i.e. fuel oil of high viscosity and light fuel, i.e. fuel of low viscosity.

Such devices must provide for pre-treatment of the fuel oil, the supply thereof and the change-over from one kind of fuel to the other.

The device can be most advantageously used for diesel engines designed as main marine engines on river, lake, tramp ships characterized by frequent changes of operating duties including brief stoppages.

BACKGROUND OF THE INVENTION

The application of heavy, high viscosity fuel oils requires their pre-treatment involving the heating of the fuel up to a certain temperature so as to decrease the viscosity of the heavy fuel down to that of the light, or diesel fuel.

There is known a single loop device for supplying fuel to a diesel engine (cf. P. P. Botkin, V. A. Somov "Application of Heavy Fuel Oils in Marine Diesel Engines", Sudpromgis, 1959, p. 111) comprising a heavy fuel tank and a diesel oil tank, the tanks being alternately connected via a three-way cock to a loop supplying fuel to a diesel engine, the diesel engine incorporating a fuel priming pump, a fuel heater and a filter.

However, as light and heavy fuels enter the device alternately and pass along the same pipes, a failure of any of the components necessitates stoppage of the diesel engine for repairs.

Besides, a large amount of fuel in the device makes it impossible to effect a rapid change-over from one kind of fuel to the other, the replacement of one kind of fuel with the other taking place gradually, as the fuel is burnt in the diesel engine.

Furthermore, it is impossible to effect the pre-heating of heavy fuel in the device when the engine operates on light fuel, as in this case the heavy fuel should be heated in the tank up to the working temperature which may result in an ignition thereof.

As heavy fuel shouldn't be kept in the tank at working temperature, automatic change-over from one kind of fuel to the other cannot be effected.

There is also known a device (cf P. P. Botkin, V. A. Somov, "Application of Heavy Fuel Oils in Marine Diesel Engines", Sudpromgis, 1959, pp. 112, 113) comprising a light fuel loop and a heavy fuel loop, the loops being alternately connected to a diesel engine via a system of stop valves. Each loop comprises a fuel tank, a fuel priming pump, a filter and interconnecting piping. Two fuel pre-treatment loops make it possible to pre-heat heavy fuel while the engine works on light fuel.

The delivery of the pre-heated heavy fuel to fuel injection pumps and injectors results in a greater wear of said device caused by a temperature difference of the fuel and the fuel injection system sometimes causing scuffing and jamming of precision pairs of the fuel injection apparatus, i.e. a failure thereof.

Therefore the change-over from the light fuel to the heavy fuel is effected with some time delay enabling fuel injection pumps and fuel injectors to be warmed to a temperature near that of the heavy fuel. In this period the diesel engine receives a mixture of heavy and light fuels, the amount of the heavy fuel in the mixture increasing with the fuel injection apparatus getting more warmed up.

However, a large number of stop valves (six, at least) which are to be switched over to the opposite direction when changing the fuel delivered to the priming pipe affects the reliability of the device, the control thereof being more complicated because of sealing of the stop valves and leakage of the heated heavy fuel likely to occur therethrough.

Also known in the art is a fuel supply device for a diesel engine, described in the USSR Inventor's Certificate No. 619686 comprising alternately connected to a diesel engine a light fuel loop and a heavy fuel loop incorporating a tank and a fuel priming pump, the loops being in communication with a suction pipe of fuel injection pumps of the diesel engine via a system of stop valves. Besides, the light fuel loop additionally communicates with the diesel engine for cooling fuel injectors and warming fuel injection pumps thereof.

The device comprises two independent loops, circulation of fuel through pipes in each loop being possible without mixing fuel flows. The loops are in communication with the suction pipe of fuel injection pumps of the engine via six stop valve units. Besides, the light fuel loop is used for preheating the light fuel by passing it through cooling cavities of fuel injectors thus providing gradual warming-up of the fuel equipment by heat removed from fuel injectors in case of cold start of the engine on light fuel. Simultaneously the heavy fuel circulating through its loop is heated by a special purpose heater. A temperature level of both fuels is monitored by a special automatic device, an order for the diesel engine change-over to the heavy fuel being formed at the appropriate instant.

However, the above device is rendered unreliable due to a large number of stop valves, each having two positions: open and closed. To actuate the units each of them should be provided with a drive supplied with a control signal to bring it into one of said positions. Moreover, each stop valve has a stem linking the drive with a closing element of the stop valve unit. These stems should be sealed to avoid leakage of the fuel passing through the stop valve units. Each of said units decreases the reliability of the device as a whole, since damage of one of the units will disturb the normal operation of the device this arising from mixing of the fuels, which can result in an emergency situation.

SUMMARY OF THE INVENTION

It is an object of the present invention to increase the operating reliability of a fuel supply device for a diesel engine.

Another object of the present invention is to provide automatic change-over of the fuels.

With these and other objects in view, there is provided a device for supplying fuel to a diesel engine comprising alternately connected to a diesel engine a light fuel loop and a heavy fuel loop incorporating a tank and a fuel priming pump, the loops being in communication via a system of stop valves with a suction pipe of the diesel engine, the light fuel loop additionally communicating with the diesel engine for cooling fuel injectors and warming up its fuel injection pumps, wherein, according to the invention, the system of stop valves comprises a logical element "OR" having its output connected to the suction pipe of the diesel engine, a pressure controller connected with the first input of the logical element "OR" for creating a reference pressure, a flow switch valve having its input connected to the second input of the logical element "OR", and to the fuel priming pump of the heavy fuel loop, the output of the flow switch valve being in communication with the tank of the heavy fuel loop and supplying a signal to the logical element "OR".

The logical element "OR" introduced into the fuel supply device together with the pressure controller incorporated in the light fuel loop and together with the flow switch valve incorporated in the heavy fuel loop makes it possible to reduce the number of stop valve units, thus increasing the reliability of the device.

It is desirable that the flow switch valve be made as a temperature distributor having its first output connected to the second input of the logical element "OR" and its second output connected to the tank of the heavy fuel loop, the input of the temperature distributor being connected with the fuel priming pump of the heavy fuel loop.

This arrangement enables the device to operate automatically in case of the change-over from one kind of fuel to the other.

The above, and other features, objects and advantages of the present invention will be apparent in the following detailed description of illustrative embodiments thereof which is to be read in conjunction with the accompanying drawings, wherein:

DETAILED DESCRIPTION OF THE INVENTION

Figure 1:
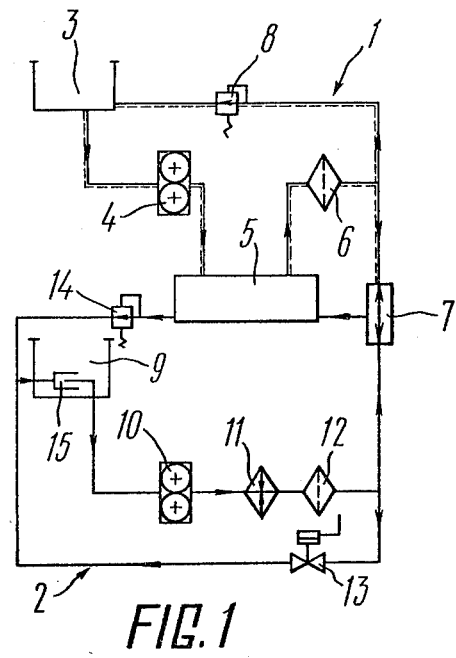
FIG. 1 is a block diagram of a fuel supply device for a diesel engine, according to the invention.

Referring now to the accompanying drawings and initally to FIG. 1, the proposed fuel supply device for a diesel engine comprises a light fuel loop 1 and a heavy fuel loop 2. The light fuel loop 1 incorporates a tank 3 for light fuel, and a fuel priming pump 4. Flow of the light fuel passes through cooling cavities of fuel injectors (not shown) of a diesel engine 5, a filter 6 where the flow is cleaned from mechanical impurities. After the filter 6 the light fuel flow may be directed either to the first input of a logical element 7 "OR" or to a pressure controller 8. The pressure controller 8 creates in the light fuel loop 1 a reference pressure equal to $P_1$. The heavy fuel loop 2 comprises a tank 9 for heavy fuel, a fuel priming pump 10, a preheater 11 of the heavy fuel, a filter 12 for cleaning the preheated heavy fuel from mechanical impurities. After the filter 12 the heavy fuel flow may be directed either to the logical element 7 "OR" or to a flow switch valve 13. The pressure controller 8, the logical element 7 "OR" and the flow switch valve 13 form a system of stop valves. The output of the logical element 7 "OR" is connected to a suction pipe of fuel injection pumps (not shown) of the diesel engine 5. At the output of the suction pipe of the fuel injection pumps there is arranged a pressure controller 14 preventing the light fuel from flowing into the heavy fuel tank 9. In the heavy fuel tank 9 there is disposed a device 15 which directs the heated flow of heavy fuel, circulating in the heavy fuel loop 2 to the suction pipe (not shown) of the fuel priming pump 10.

Figure 2:
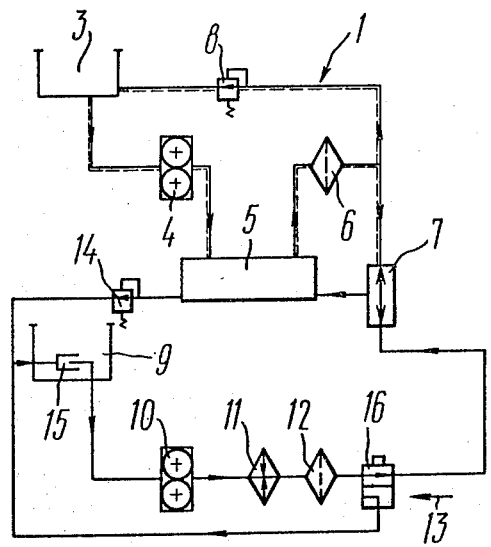
FIG. 2 shows another embodiment of the invention wherein a flow switch valve is made as a temperature distributor.

Shown in FIG. 2 is a fuel supply device for a diesel engine, wherein the flow switch valve 13 is made as a temperature distributor 16. The rest of the components are similar to those of FIG. 1 and bear the same reference numerals. The first output of the temperature distributor 16 (FIG. 2) is connected to the second input of the logical element 7 "OR", the second output being connected to the tank 9 of the heavy fuel loop 2. An input of the temperature distributor 16 is coupled via the preheater 11 and the filter 12 with the fuel priming pump 10.

The fuel supply device for a diesel engine according to the present invention operates as follows. The diesel engine 5 (FIG. 1) is started on light fuel, so that the loop 1 is in operation while the heavy fuel loop 2 is switched for the temperature treatment of heavy fuel. The fuel priming pump 4 draws light fuel from the tank 3 and directs it through the cooling cavities of the fuel injectors of the diesel engine 5. In the process of cooling fuel injectors by means of passing through the cooling cavities thereof the fuel flow gets heated. After the cooling cavities of fuel injectors the fuel flows through the filter 6 where it gets cleaned from mechanical impurities and arrives at one of the inputs of the logical element 7 "OR". This input of the logical element 7 "OR" is also connected to the pressure controller 8 arranged in the line of fuel discharge to the tank 3 of the light fuel. The pressure controller is adjusted to the reference pressure $P_1$ maintained in the light fuel loop 1 in the portion thereof between the fuel priming pump 4 and the pressure controller 8. Since there is no pressure at the other input of the logical element 7 "OR" at the moment, the light fuel flows via the logical element 7 "OR" into the suction pipe and is further delivered by the fuel injection pumps into the cylinders of the diesel engine 5 where it burns. The heated light fuel entering the fuel injection pumps warms them up to the temperature of the cylinder piston group of the diesel engine 5.

The pressure controller 14 arranged at the outlet of the line of fuel injection pumps creates a pressure $P_3$ which is greater than $P_1$, therefore the light fuel flow cannot get into the heavy fuel tank 9. The fuel priming pump 4 delivers an amount of fuel that is several times greater than the fuel consumption of the diesel engine 5 when in operation. The excess light fuel is discharged into the light fuel tank 3 via the pressure controller 8. During this period the heavy fuel loop 2 operates as follows. The heavy fuel from the heavy fuel tank 9 is drawn by means of the fuel priming pump 10, then it passes through the heater 11 where it is heated by a heat-carrying agent available on the ship, passes through the filter 12 and arrives at the flow switch valve 13. The flow switch valve is in the open position at the moment. As hydraulic resistance of the discharge pipe is negligible, and the pressure created between the filter 12 and the flow switch valve 12 is lower than the pressure in the light fuel loop 1, the logical element 7 "OR" delivers light fuel to the suction pipe of fuel injection pumps. The heavy fuel flow circulating in the heavy fuel loop 2 gradually gets heated to the temperature at which its viscosity becomes approximately equal to that of the light fuel, the light fuel meanwhile warming fuel injection pumps. After the heavy fuel is heated up to a preset temperature, the temperature being monitored by sensors (not shown) arranged in the heavy fuel loop 2, and the fuel injection equipment is warmed up to a certain temperature corresponding to the load of the diesel engine 5, a signal for closing the flow switch valve 13 is generated by sensors (not shown) disposed in the light fuel loop 1. As soon as the signal for closing the flow switch valve 13 has arrived, and the pressure controller 14 has cut off the discharge of the heavy fuel into the tank 9, a pressure $P_2$ is created in the piping between the flow switch valve 13 and the logical element 7 "OR", which pressure $P_2$ should be higher than $P_1$ and equal or slightly higher than $P_3$. As the heavy fuel pressure $P_2$, which is greater than the light fuel pressure $P_1$, acts from the side of the outer input of the logical element 7 "OR", the logical element 7 "OR" will direct the heavy fuel flow to the suction pipe of the fuel injection pumps. The fuel priming pump 10 also delivers an amount of fuel which is greater than that required for diesel engine 5 operation. The excess of the heavy fuel is discharged into the heavy fuel tank 9 via the device 15.

Since a portion of heavy fuel has been injected into the engine cylinders and burnt therein, this same amount of heavy fuel is pumped from the heavy fuel tank 9 through an open end face of the device 15. During this period the light fuel loop 1 operates as follows. As the pressure $P_2$ in the heavy fuel loop 2 is higher than the pressure $P_1$ in the light fuel loop 1, the logical element 7 "OR" directs the heavy fuel flow to the suction pipe of the fuel injection pumps. The flow of the light fuel is drawn from the light fuel tank 3 by the fuel priming pump 4 and is directed into the cooling cavities of the fuel injectors of the diesel engine 5, wherefrom it passes through the filter 6 and is discharged via the pressure controller 8 into the light fuel tank 3.

To change-over the diesel engine 5 to the light fuel the flow switch valve 13 is opened and the heavy fuel starts its circulation in the heavy fuel loop 2. Now the diesel engine 5 is fed with light fuel from the light fuel loop 1.

The device shown in FIG. 2 operates in a manner similar to that of the device shown in FIG. 1, the difference being in the following particulars.

The heavy fuel loop 2 (FIG. 2) operates as follows. From the tank 9 the flow of fuel is delivered by the fuel priming pump 10 to the fuel heater 11, passes through the filter 12 and arrives at the input of the temperature distributor 16. The temperature distributor 16 has a built-in sensor (not shown) for actuating a switch-over unit (not shown) of the temperature distributor 16. When the temperature of the heavy fuel flow is below a lower limit of the response of the temperature distributor 16, the entire flow is discharged into the heavy fuel tank 9, this circulation continuing till the temperature of the fuel reaches the lower limit at which the temperature distributor 16 functions, whereby a control unit (not shown) of the temperature distributor 16 starts to by-pass a portion of the heavy fuel flow through the other output of the temperature distributor 16 to the input of the logical element 7 "OR" connected with the heavy fuel flow loop 2. As the heavy fuel is heated in the heavy fuel loop 2, the control unit of the temperature distributor 16 passes a larger amount of heavy fuel to the input of the logical element 7 "OR", and, as soon as the pressure $P_2$ between the temperature distributor 16 and the input of the logical element 7 "OR" exceeds the pressure $P_1$ in the light fuel loop 1, the logical element 7 "OR" directs the heavy fuel flow to the suction pipe of the fuel injection pumps (not shown) of the diesel engine 5. To change-over the diesel engine 5 to the light fuel, the heater 11 or the priming pump 10 shold be disconnected. In this case either the temperature distributor 16 will direct the heavy fuel flow to the heavy fuel tank 9, or the logical element 7 "OR" will switch over the light fuel loop 1 to feed the diesel engine 5, since the pressure $P_2$ becomes lower than $P_1$.

As seen from the above, the proposed fuel supply device for a diesel engine according to the present invention enables the operational reliability of the device to be increased as well as an automatic change-over from one kind of fuel to the other one to be provided.

While particular embodiments of the invention have been shown and described, it will be obvious to those skilled in the art that various changes and modifications may be made thereto without departing from the essential features of the present invention, as defined in the appended claims.

What is claimed is:

1. A fuel supply device for a diesel engine operating on a light fuel and a heavy fuel delivered to its suction pipe, and also using the light fuel for cooling fuel injectors and for warming fuel injection pumps, comprising:

a light fuel loop;

a heavy fuel loop;

a tank of said heavy fuel loop;

a fuel priming pump of said heavy fuel loop;

a system of stop valves alternately connecting said light fuel loop and said heavy fuel loop to said suction pipe, said light fuel loop being additionally communicated with said diesel engine for cooling said fuel injectors and warming said fuel injection pumps;

a logical element "OR" of said system of stop valves having a first input, a second input and an output, the output of said logical element "OR" being connected with said suction pipe of said diesel engine;

a pressure controller for creating a reference pressure in said system of stop valves connected to the first input of said logical element "OR";

a flow switch valve in said system of stop valves, having its input connected to the second input of said logical element "OR" and with said fuel priming pump, the output of said flow switch valve being connected with said tank.

2. A fuel supply device for a diesel engine as claimed in claim 1, wherein said flow switch valve is made as a temperature distributor, having an input, a first and a second outputs;

the input of said temperature distributor being connected to said fuel priming pump;

said first output of said temperature distributor being connected with said second input of said logical element "OR";

the second output of said temperature distributor being connected with said tank.

* * * * *